US012337590B2

(12) United States Patent
Satake

(10) Patent No.: US 12,337,590 B2
(45) Date of Patent: Jun. 24, 2025

(54) PRINTING APPARATUS

(71) Applicant: SEIKO EPSON CORPORATION, Tokyo (JP)

(72) Inventor: Akihiro Satake, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 294 days.

(21) Appl. No.: 18/185,932

(22) Filed: Mar. 17, 2023

(65) Prior Publication Data

US 2023/0294424 A1 Sep. 21, 2023

(30) Foreign Application Priority Data

Mar. 18, 2022 (JP) ................................ 2022-043921

(51) Int. Cl.

*B41J 11/00* (2006.01)
*B41J 15/04* (2006.01)
*B41J 25/00* (2006.01)

(52) U.S. Cl.

CPC .......... *B41J 11/007* (2013.01); *B41J 11/0025* (2013.01); *B41J 11/0045* (2013.01); *B41J 11/0085* (2013.01); *B41J 15/04* (2013.01); *B41J 15/046* (2013.01); *B41J 25/001* (2013.01); *B65H 2406/351* (2013.01); *B65H 2406/362* (2013.01); *B65H 2801/21* (2013.01)

(58) Field of Classification Search

CPC ... B41J 11/0025; B41J 11/0085; B41J 11/007; B41J 11/0045; B41J 15/046; B65H 7/20; B65H 2801/21; B65H 2801/15; B65H 2406/351; B65H 2406/362; B65H 5/222; B65H 2511/12

See application file for complete search history.

(56) References Cited

FOREIGN PATENT DOCUMENTS

JP 2000-153604 A 6/2000
JP 2011201210 A * 10/2011

* cited by examiner

*Primary Examiner* — Leslie J Evanisko
*Assistant Examiner* — Thomas Ray Knief
(74) *Attorney, Agent, or Firm* — WORKMAN NYDEGGER

(57) ABSTRACT

A printing apparatus includes a printing head discharging ink onto a recording medium, a recording medium support unit supporting the recording medium by a support surface, an air intake unit sucking air from suction holes, and a suction region alteration unit. The suction region alteration unit includes a first guide member and a second guide member disposed side by side, a first mobile body movable along the first guide member, a second mobile body movable along the second guide member, a synchronization mechanism synchronizing the movement of the first mobile body and the movement of the second mobile body, a first blocking structure movable together with the first mobile body and the second mobile body and including a first sheet having flexibility, and a first accommodation unit accommodating at least a portion of the first sheet.

7 Claims, 6 Drawing Sheets

PRINTING APPARATUS

The present application is based on, and claims priority from JP Application Serial Number 2022-043921, filed Mar. 18, 2022, the disclosure of which is hereby incorporated by reference herein in its entirety.

BACKGROUND

1. Technical Field

The disclosure relates to a printing apparatus.

2. Related Art

In known art, in printing apparatuses that suction a recording medium to a platen including a plurality of suction holes and perform printing on the suctioned recording medium, a printing apparatus is known that can change an effective suction area, over which the recording medium can be suctioned, in accordance with a width of the recording medium. For example, JP-A-2000-153604 discloses an ink jet recording device capable of changing an effective suction area by moving a blocking body, which blocks suction holes, in a direction intersecting a transport direction of a recording medium.

In a printing apparatus as disclosed in JP-A-2000-153604, when a flat plate-shaped blocking body is used, a large space is required for housing the blocking body, and there is a problem that it is difficult to downsize a mechanism for closing the suction holes. Further, when a flexible sheet-like blocking body is used, there is a problem that it is difficult to move the blocking body such that the blocking body is not in a position of being inclined with respect to the transport direction of the recording medium.

SUMMARY

An aspect of the present disclosure is a printing apparatus including a transport unit configured to transport a recording medium along a first direction, a printing head configured to discharge ink onto the recording medium, a recording medium support unit including a support surface and configured to support the recording medium by the support surface, the support surface facing the printing head with a transport path of the recording medium interposed between the printing head and the support surface, an air intake unit configured to suck air, and a suction region alteration unit, wherein the support surface is constituted by a surface extending along the first direction and a second direction orthogonal to the first direction, and includes a suction region provided with a plurality of suction holes, the air intake unit sucks air from the plurality of suction holes via a duct disposed at a surface on an opposite side from the support surface, the suction region alteration unit includes a first guide member and a second guide member that are members extending in the second direction and that are disposed side by side in the first direction with the recording medium support unit interposed between the first guide member and the second guide member, a first mobile body configured to move along the first guide member, a second mobile body configured to move along the second guide member, a synchronization mechanism configured to synchronize movement of the first mobile body and movement of the second mobile body, a first blocking structure including a first suspension portion suspended between the first mobile body and the second mobile body, and a first sheet having flexibility and coupled to the first suspension portion, and a first accommodation unit accommodating at least a portion of the first sheet, a position, of the first suspension portion, facing the support surface is movable in the second direction together with the first mobile body and the second mobile body, the first sheet extends to one side in the second direction from the first suspension portion, and is larger than the suction region in the first direction, the first accommodation unit is disposed on the one side in the second direction of the recording medium support unit, and an opening of the first accommodation unit is at a position not overlapping the suction region in plan view, and the first sheet accommodated in the first accommodation unit is configured to be pulled out to a position overlapping a portion of the suction region in plan view by the first mobile body being moved in a direction away from the first accommodation unit.

DESCRIPTION OF EXEMPLARY EMBODIMENTS

1. Overall Configuration

Figure 1:
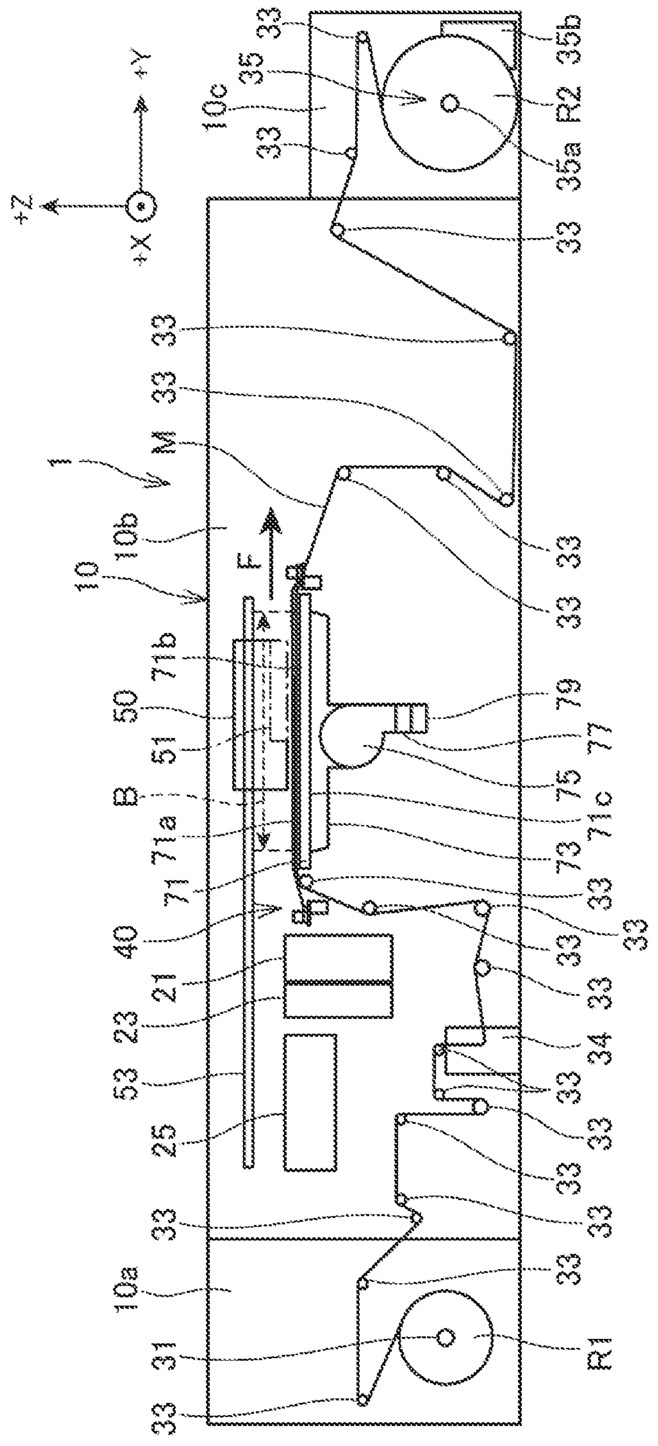
FIG. 1 is a side view of a printing apparatus according to an embodiment.

FIG. 1 is a perspective view of a printing apparatus 1 according to an embodiment. The printing apparatus 1 is a device for performing printing on a recording medium M.

FIG. 1 illustrates an X-axis, a Y-axis, and a Z-axis. The X-axis, the Y-axis, and the Z-axis are mutually orthogonal. The Z-axis is an axis extending in the up-down direction, and can also be said to be an axis extending in the vertical direction. The X-axis and the Y-axis are parallel to the horizontal plane. In the following description, a direction along the X-axis is the front-rear direction, and a direction along the Y-axis is the left-right direction. Specifically, the positive direction along the Z-axis is referred to as an upward direction, the positive direction along the X-axis is referred to as a forward direction, and the positive direction along the Y-axis is referred to as a rightward direction. The X-axis, the Y-axis, and the Z-axis in FIG. 1 indicate the same direction in each of the drawings described below. Note that the direction along the X-axis, that is, the front-rear direction, corresponds to an example of a "second direction". Further, the direction along the Y-axis, that is, the left-right direction corresponds to an example of a "first direction".

The printing apparatus 1 is provided with a housing 10. The housing 10 is a hollow box body constituted by a frame-shaped frame and panels fixed to the frame. The housing 10 stores each of devices, such as a carriage 50, a platen 71, a wiper mechanism 21, a flushing mechanism 23, and a cap mechanism 25 described below, a roll medium R1, and a roll-shaped printed material R2. The interior of the housing 10 is divided into three, namely, a medium storage unit 10*a*, a printing unit 10*b*, and a printed material storage unit 10*c*.

The medium storage unit 10*a* is positioned at a left portion of the housing 10. A medium mounting unit 31 is provided at the medium storage unit 10*a*. The medium mounting portion 31 is a cylindrical rod extending in the front-rear direction, and is fixed to the housing 10.

The roll medium R1 is accommodated in the medium storage unit 10*a*. The roll medium R1 is configured by rolling the recording medium M, which is a long belt-shaped sheet, into a roll shape, and is mounted to the medium mounting unit 31 by hand by an operator. The medium mounting portion 31 passes through the center of the roll medium 31, and rotatably supports the roll medium R1. The recording medium M is pulled out from the roll medium R1, is guided by a plurality of rollers 33, and is transported to a printing position. At the printing position, ink is discharged onto the recording medium M by a printing head 51, and printing is performed on the recording medium M. The recording medium M after printing is wound up by a winding unit 35 disposed in the printed material storage unit 10*c*, and is rolled into a roll shape to form the roll-shaped printed material R2. Thereafter, the roll-shaped printed material R2 is removed from the winding unit 35 by hand by the operator, and is carried to the outside of the housing 10 of the printing apparatus 1.

The rollers 33 are rotatably supported by the housing 10. The printing apparatus 1 is provided with the plurality of rollers 33, and at least some of the rollers 33 are rotated by the power of a transport motor 34, and transport the recording medium M. Further, the recording medium M is pulled by the power of a winding motor 35*b* that drives the winding unit 35, and is transported. In FIG. 1, the transport direction of the recording medium M is indicated by a reference sign F. The transport direction F is a direction along the left-right direction of the printing apparatus 1. The rollers 33, the transport motor 34, and the winding unit 35 correspond to an example of a "transport unit" that transports the recording medium M in the transport direction F.

The printing unit 10*b* is a compartment positioned to the right of the medium storage unit 10*a*, and is positioned at the center in the left-right direction of the housing 10. In the printing unit 10*b*, the carriage 50 and the platen 71 are provided so as to sandwich the recording medium M transported along the rollers 33 from above and below, and the wiper mechanism 21, the flushing mechanism 23, and the cap mechanism 25 are provided on the left side of the platen 71. The housing 10 can open and close to the front of the printing unit 10*b*, and the operator can access the devices inside the printing unit 10*b*.

The carriage 50 is a carriage that is movably supported by a carriage guide 53, which is a shaft extending in the left-right direction, and is provided above the platen 71. The carriage 50 is driven by the power of a carriage motor (not illustrated), and moves in the left-right direction. The printing head 51 is mounted to a lower portion of the carriage 50. The printing head 51 is provided with piezo actuators (not illustrated), and with nozzles. By driving the piezo actuators, the printing head 51 discharges ink from the nozzles opening in the lower surface of the printing head 51.

The platen 71 is a substantially flat plate-shaped member. The upper surface of the platen 71 faces the printing head 51 and a transport path of the recording medium M, and is a support surface 71*a* that supports the recording medium M. The platen 71 corresponds to an example of a "recording medium support unit". The support surface 71*a* is a flat surface along the front-rear direction, and the horizontal direction orthogonal to the front-rear direction, and a portion of the support surface 71*a* may be a curved surface.

A plurality of suction holes 71*b* penetrating in the vertical direction are provided on the support surface 71*a*. The suction hole 71*b* is a hole that is sufficiently smaller than the recording medium M. In the support surface 71*b*, a region in which the plurality of suction holes 71*b* are provided is defined as a suction region B.

The suction hole 71*b* communicates with a back surface 71*c*, which is the surface on the opposite side from the support surface 71*a*, and with a space above the support surface 71*a*. The suction hole 71*b* communicates with an internal space of an air intake duct 73 formed at the back surface 71*c* side of the platen 71. The air intake duct 73 is a hollow duct, and the upper end of the intake duct 73 is closely adhered to the back surface 71*c*, in a range containing the suction region B in plan view. The lower end of the air intake duct 73 is coupled to a suction port of a blower 75.

The blower 75 is provided with a motor (not illustrated), and an impeller (not illustrated) that is coupled to a rotary shaft of the motor. The blower 75 drives the motor to rotate the impeller, and thereby sucks air from the suction port. The air sucked by the blower 75 is discharged from an exhaust port provided at the lower end of the blower 75, and is discarded through an exhaust duct 77 and exhaust holes 79. In this way, air is sucked from the suction holes 71*b* through the air intake duct 73 by the operation of the blower 75. The blower 75 corresponds to an example of an "air intake unit". The air intake duct 73 corresponds to an example of a "duct".

When the blower 75 sucks air while the recording medium M is supported on the support surface 71*a*, a negative pressure is generated between the suction holes 71*b* and the recording medium M, and the recording medium M is suctioned to the support surface 71*a*. As a result, a state is obtained in which the recording medium M is suctioned to the support surface 71*a* below the printing head 51, and an appropriate gap is secured between the nozzles of the printing head 51 and the recording medium M. In this way, the printing quality of the printing apparatus 1 can be stabilized.

The printing apparatus 1 is provided with the suction region alteration unit 40 in the printing unit 10*b*. By covering a portion of the suction holes 71*b* positioned in the suction region B, the suction region alteration unit 40 inhibits the sucking of air from the suction holes 71*b*.

For example, when a width of the recording medium M is narrower than a width in the front-rear direction of the suction region B, of the suction holes 71*b* positioned in the suction region B, the suction holes 71*b* positioned to the outside, in the front-rear direction, of the suction region B do not overlap the recording medium M, and are in an open state. In this case, since air flows freely in some of the suction holes 71*b*, the negative pressure generated in the air intake duct 73 by the blower 75 is attenuated by air intake from the suction holes 71*b* that do not overlap the recording medium M. Thus, a suction force for suctioning the recording medium M to the support surface 71*a* is reduced. The suction region alteration unit 40 suppresses the attenuation of the suction force at the support surface 71*a* by inhibiting the sucking of air in the suction holes 71*b* at positions that do not overlap the recording medium M. In this way, when printing is performed on the recording medium M that is narrower in width than the suction region B, the recording medium M can be reliably suctioned by the support surface 71*a*, and the printing can be performed with a stable quality.

The wiper mechanism 21 wipes a nozzle surface of the printing head 51 by advancing a wiper blade (not illustrated) to a path of the printing head 51. The flushing mechanism 23 is provided with an ink receptor that receives ink discharged by a flushing operation of the printing head 51, and a pump that transmits waste ink stored in the ink receptor to a waste ink tank. The cap mechanism 25 is provided with a concave-shaped cap that engages with the nozzle surface of the printing head 51. The cap mechanism 25 prevents drying of the ink by causing a cap to cover the printing head 51 when the printing head 51 is standing by for printing. Further, the cap mechanism 25 includes a suction pump that sucks the ink inside the cap. The cap mechanism 25 has a function to perform suction, using the suction pump, in a state in which the cap is engaged with the printing head 51, and perform cleaning of the nozzles.

The carriage 50 is movable in the left-right direction to a position overlapping the wiper mechanism 21, the flushing mechanism 23, and the cap mechanism 25 in plan view. Further, the wiper mechanism 21, the flushing mechanism 23, and the cap mechanism 25 are normally respectively moved downward to a position that does not interfere with the carriage 50. The wiper mechanism 21, the flushing mechanism 23, and the cap mechanism 25 move upward to a position that interferes with the printing head 51, as necessary, by an actuator provided in each.

The winding unit 35, which includes a cylindrical winding shaft 35*a* extending in the front-rear direction and the winding motor 35*b*, is disposed in the printed material storage unit 10*c*. The winding motor 35*b* is a motor that rotates the winding shaft 35*a*.

2. Configuration of Suction Region Alteration Unit

Figure 2:
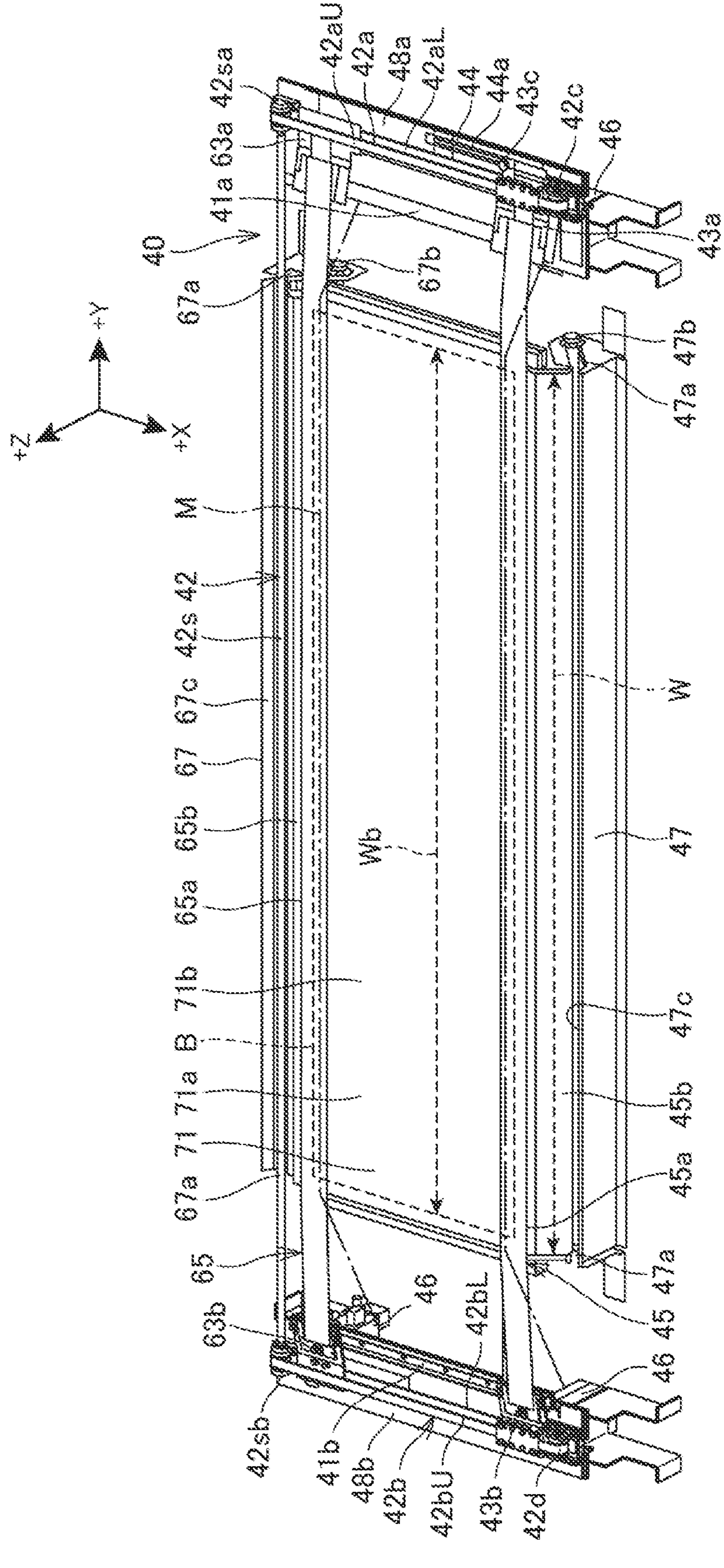
FIG. 2 is a perspective view of a suction region alteration unit.
Figure 3:
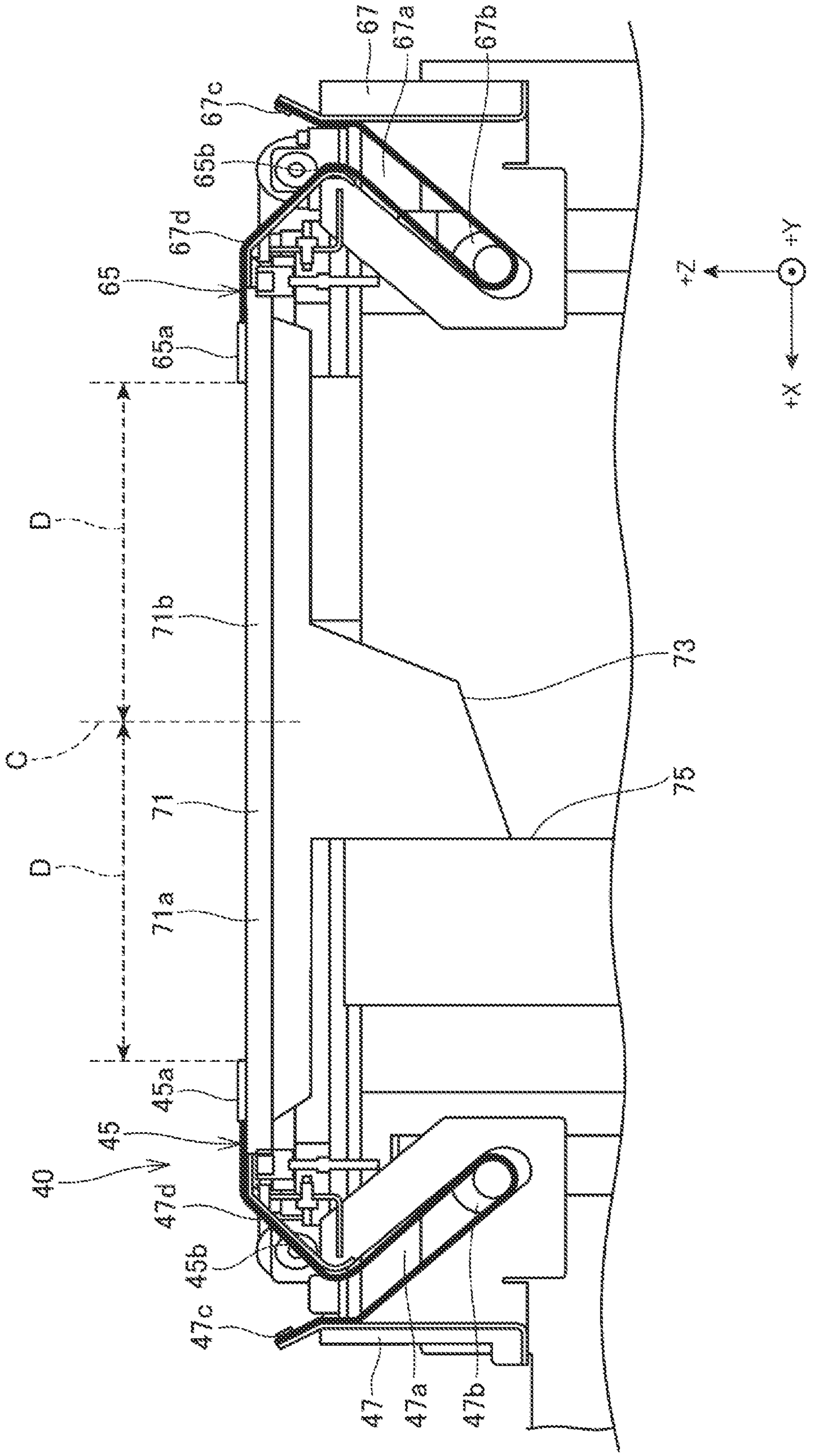
FIG. 3 is a cross-sectional view of the suction region alteration unit.
Figure 4:
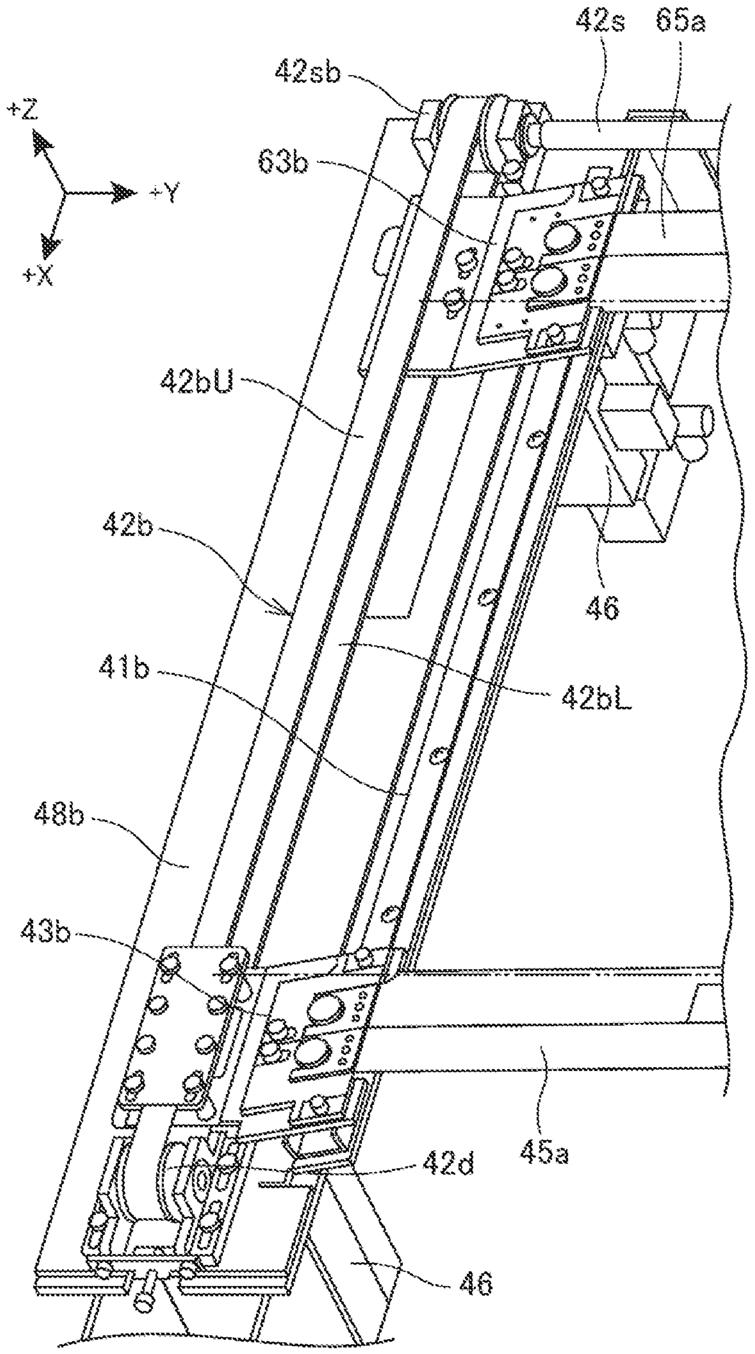
FIG. 4 is an enlarged perspective view of the suction region alteration unit.
Figure 5:
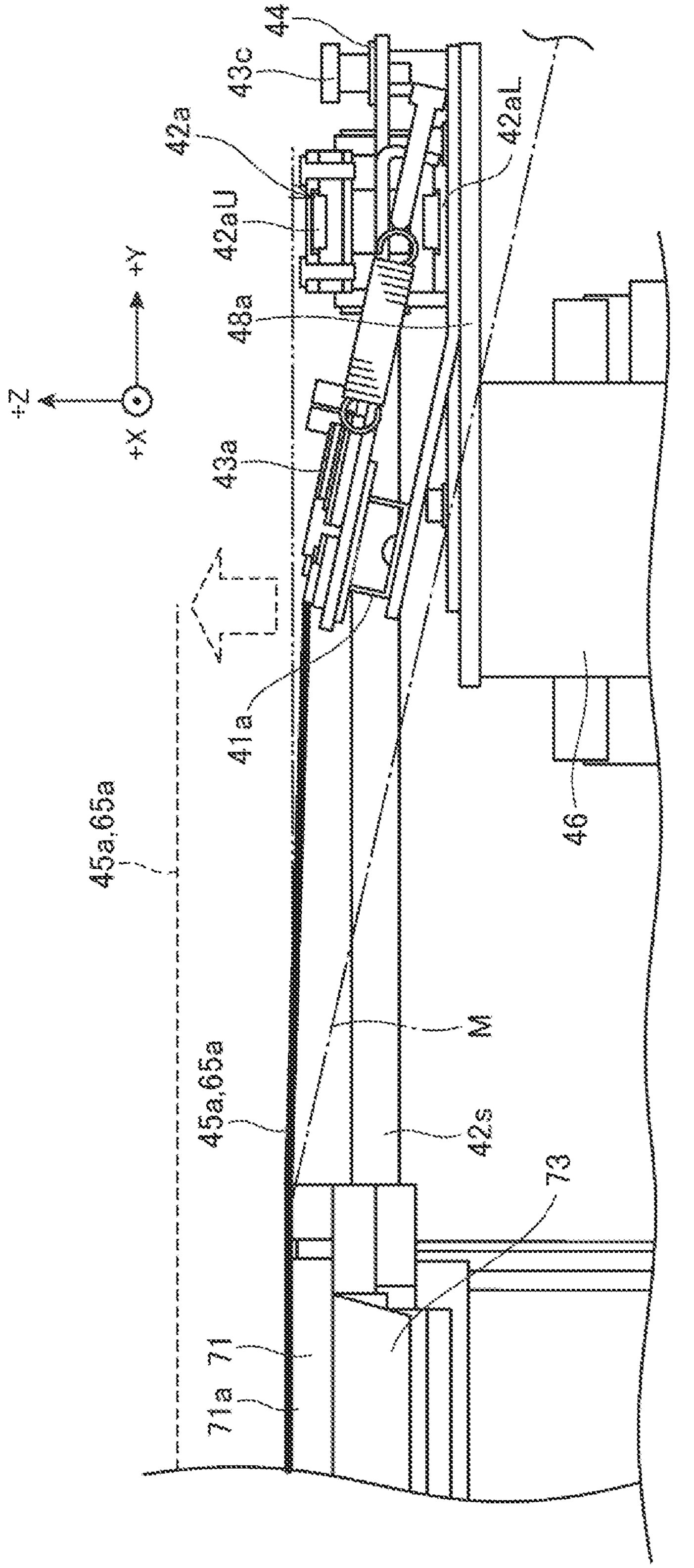
FIG. 5 is a side view of main portions of the suction region alteration unit.

FIG. 2 is a perspective view of the suction region alteration unit 40. FIG. 3 is a cross-sectional view of the suction region alteration unit 40, and illustrates a cross-section perpendicular to the left-right direction. FIG. 4 is an enlarged perspective view of the suction region alteration unit 40. FIG. 5 is a side view of the suction region alteration unit 40, and illustrates the suction region alteration unit 40 as viewed from the front.

As illustrated in FIG. 2, the suction region alteration unit 40 is provided with a first guide member 41*a*, a second guide member 41*b*, a first mobile body 43*a*, a second mobile body 43*b*, a first blocking structure 45, and a first accommodation unit 47. By moving the first mobile body 43*a* and the second mobile body 43*b* along the first guide member 41*a* and the second guide member 41*b*, the suction region alteration unit 40 covers a portion of the suction region B using the first blocking structure 45. The first accommodation unit 47 accommodates a portion of the first blocking structure 45.

The first guide member 41*a*, and the second guide member 41*b* are members extending in the front-rear direction, and are disposed side by side in the left-right direction with the platen 71 sandwiched therebetween. The first guide member 41*a* is disposed to the right of the platen 71, and the second guide member 41*b* is disposed on the left of the platen 71.

The first mobile body 43*a* is configured to be movable in the front-rear direction along the first guide member 41*a*, and is fixed to a first belt 42*a* to be described below. The second mobile body 43*b* is configured to be movable in the front-rear direction along the second guide member 41*b*, and is fixed to a second belt 42*b* to be described below. A pin 43*c* is provided penetrating the first mobile body 43*a* in the vertical direction. The pin 43*c* fits into a long hole 44*a* included in a sliding guide 44. The sliding guide 44 is provided along the front-rear direction and is a member including the long hole 44*a*. The long hole 44*a* is provided in a range overlapping a front half of the support surface 71*a* in the front-rear direction. The pin 43*c* functions as a screw, and by tightening this screw, the first mobile body 43*a* can be fixed at any desired position in the long hole 44*a*. As a result, the first mobile body 43*a* can be fixed at any desired position in the front half of the support surface 71*a*.

The first blocking structure 45 includes a first suspension portion 45*a* and a first sheet 45*b*. The first suspension portion 45*a* is suspended between the first mobile body 43*a* and the second mobile body 43*b*. The first suspension portion 45*a* extends along the left-right direction, is constituted by a resin band facing the support surface 71*a*, and has flexibility. A position of the first suspension portion 45*a* with respect to the support surface 71*a* can be moved together with the first mobile body 43*a* and the second mobile body 43*b*.

The first sheet 45*b* is a sheet having flexibility, and is a synthetic resin, for example. The first sheet 45*b* may be a sheet having low air permeability. Specifically, the air permeability of the first sheet 45*b* is low to a degree that, when the first sheet 45*b* overlaps the suction holes 71*b*, the first sheet 45*b* imparts a ventilation resistance to an air flow passing through the suction holes 71*b*. The first sheet 45*b* may block the suction holes 71*b* and block the air flow through the suction holes 71*b*. A width W in the left-right direction of the first sheet 45*b* is greater than a width Wb in the left-right direction of the suction region B. The rear end of the first sheet 45*b* is coupled to the first suspension portion 45*a*, and the front end of the first sheet 45*b* is fixed to the first accommodation unit 47. In other words, the first sheet 45*b* extends from the first suspension portion 45*a* to the front in the front-rear direction. The front is an example of "one side in the second direction". The front end of the first sheet 45*b* corresponds to an example of "one end of a first sheet". The rear end of the first sheet portion 45*b* corresponds to "another end of the first sheet". As described below, as a result of the first suspension portion 45*a* moving in the rearward direction together with the first mobile body 43*a* and the second mobile body 43*b*, the first sheet 45*b* is pulled to a position overlapping a portion of the suction region B.

As illustrated in FIG. 2, the first accommodation unit 47 is disposed to the front of the platen 71, at a position where at least an opening portion thereof does not overlap the suction region B in plan view. The first accommodation unit 47 accommodates a portion of the first sheet 45*b*. The first accommodation unit 47 extends across the width W of the first sheet 45*b* in the left-right direction. The first accommodation unit 47 is provided with a sheet fixing portion 47*c*, a pulling out portion 47*d*, a first weight 47*b*, and first grooves 47*a*.

As illustrated in FIG. 3, the sheet fixing portion 47*c* is a plate-like portion that is positioned at the front end of the first accommodation unit 47 and extends across the width of the first accommodation unit 47 in the left-right direction. The sheet fixing portion 47*c* is fixed to the front end of the first sheet 45*b* over the entire left-right direction of the first sheet 45*b*, using screw fastenings, for example.

The pulling out portion 47*d* is a curved plate-like portion that is positioned at the rear end of the first accommodation unit 47 and extends across the width of the first accommodation unit 47 in the left-right direction. The upper end of the pulling out portion 47*d* extends along the support surface 71*a* of the platen 71 and the lower end extends along edges of the first grooves 47*a*. As described below, the pulling out portion 47*d* guides the first sheet 45*b* pulled from the first grooves 47*a* to the support surface 71*a*. In other words, the pulling out portion 47*d* is a portion from which the first sheet 45*b* is pulled out.

The first groove 47*a* is a groove that opens upward between the sheet fixing portion 47*c* and the pulling out portion 47*d*. An opening above the first groove 47*a* constitutes the opening portion of the first accommodation unit 47. The first grooves 47*a* are disposed at both ends of the first accommodation unit 47 in the front-rear direction. The first groove 47*a* is formed so as to be inclined rearward in the upward to downward direction. In other words, in the front-rear direction, when seen from the upper end of the first groove 47*a*, the lower end of the first groove 47*a* is in a direction closer to the center of the platen 71. The first groove 47*a* corresponds to an example of a “weight guide”.

The first weight 47*b* is an independent member having a shaft shape that fits into the first grooves 47*a*, and extends in the left-right direction. More specifically, the first weight 47*b* is constituted by a rod-shaped portion having a cylindrical shape whose length in the left-right direction is substantially equivalent to a space between the pair of first grooves 47*a*, and by retaining portions, which are disposed to the outside from both ends of the rod-shaped portion in the left and right directions, and which are larger than the width of the first grooves 47*a*. When fitted into the first grooves 47*a*, the first weight 47*b* can move diagonally upward and downward. In other words, the first grooves 47*a* are grooves that fit with the ends of the first weight 47*b* and support the first weight 47*b* to be movable diagonally upward and downward.

The front end of the first sheet 45*b* is fixed to the sheet fixing portion 47*c*, and the rear end of the first sheet 45*b* is coupled to the first suspension portion 45*a*, and overlaps the first grooves 47*a* in plan view. Under its own weight, the first weight 47*b* presses the first sheet 45*b* downward, from above the first sheet 45*b*, between the sheet fixing portion 47*c* and the pulling out portion 47*d*, and causes the first sheet 45*b* to bend. As a result, a portion of the first sheet 45*b* is accommodated in the first accommodation unit 47.

As illustrated in FIG. 2, the suction region alteration unit 40 is further provided with a synchronization mechanism 42 that synchronizes movement of the first mobile body 43*a* and movement of the second mobile body 43*b*. The synchronization mechanism 42 includes a first belt 42*a*, a second belt 42*b*, a coupling member 42*s*, a first pulley 42*sa* and a second pulley 42*sb*. The first pulley 42*sa* and the second pulley 42*sb* are pulleys having the same size as each other.

The first belt 42*a* is an annular belt disposed along the first guide member 41*a* and is stretched between the first pulley 42*sa* and a third pulley 42*c*. The first pulley 42*sa* and the third pulley 42*c* are both pulleys capable of rotating around an axis extending in the left-right direction. The first pulley 42*sa* is disposed at the rear end side of the first guide member 41*a*, and the third pulley 42*c* is disposed to the front end side of the first guide member 41*a*. In the first belt 42*a*, a portion coupling the upper end of the first pulley 42*sa* and the upper end of the third pulley 42*c* is a first belt upper portion 42*a*U. Further, in the first belt 42*a*, a portion coupling the lower end of the first pulley 42*sa* and the lower end of the third pulley 42*c* is a first belt lower portion 42*a*L.

The first mobile body 43*a* is fixed to the front portion of the first belt upper portion 42*a*U. The first mobile body 43*a* moves in the front-rear direction along the first guide member 41*a* along with the rotation of the first belt 42*a*. Expressed in reverse, the first belt 42*a* rotates as a result of the first mobile body 43*a* moving along the first guide member 41*a*. Further, the first pulley 42*sa* rotates as a result of the movement of the first belt 42*a*. The front end side of the first guide member 41*a* corresponds to an example of “one end side of a first guide member”. The rear end side of the first guide member 41*a* corresponds to an example of “another end side of the first guide member”. Further, the first pulley 42*sa* and the third pulley 42*c* together correspond to an example of a “pair of pulleys”.

The second belt 42*b* is an annular belt disposed along the second guide member 41*b* and is stretched between the second pulley 42*sb* and a fourth pulley 42*d*. The second pulley 42*sb* and the fourth pulley 42*d* are both pulleys capable of rotating around an axis extending in the left-right direction. In the second belt 42*b*, a portion coupling the upper end of the second pulley 42*sb* and the upper end of the fourth pulley 42*d* is a second belt upper portion 42*b*U. Further, in the second belt 42*b*, a portion coupling the lower end of the second pulley 42*sb* and the lower end of the fourth pulley 42*d* in the second belt 42*b* is a second belt lower portion 42*b*L.

The second mobile body 43*b* is fixed to the front portion of the second belt upper portion 42*b*U. The second mobile body 43*b* moves in the front-rear direction along the second guide member 41*b* along with the rotation of the second belt 42*b*. Expressed in reverse, the second belt 42*b* rotates as a result of the second mobile body 43*b* moving along the second guide member 41*b*. Further, the second pulley 42*sb* rotates as a result of the movement of the second belt 42*b*.

The coupling member 42*s* is a shaft coupling the first pulley 42*sa* and the second pulley 42*sb*. The coupling member 42*s* transmits torque between the first pulley 42*sa* and the second pulley 42*sb*, and rotates these pulleys in the same direction. In other words, when the first belt 42*a* rotates along with the movement of the first mobile body 43*a*, the coupling member 42*s* transmits the rotation of the first belt 42*a* to the second belt 42*b* via the first pulley 42*sa* and the second pulley 42*sb*. Therefore, the first mobile body 43*a* and the second mobile body 43*b* move in synchronization with each other, and the first suspension portion 45*a* and the first sheet 45*b* also follow this movement. In this way, the suction region alteration unit 40 is configured such that the first sheet 45*b* accommodated in the first accommodation unit 47 can be pulled out to a position overlapping a portion of the suction region B by causing the first mobile body 43*a* to move in a direction away from the first accommodation unit 47. Further, as a result of the first mobile body 43*a* and the second mobile body 43*b* moving in synchronization with each other, the first blocking structure 45 moves in the second direction while maintaining a state of being parallel to the ends in the width direction of the recording medium M. Thus, the size of a region covered by the first sheet 45*b* in the suction region B can be changed in accordance with the width of the recording medium M, in a way in which this region does not become a shape that is inclined with respect to the ends in the width direction of the recording medium M.

In the present embodiment, the center in the front-rear direction of the recording medium M is configured to pass through a center C in the front-rear direction of the support surface 71*a* illustrated in FIG. 3. Therefore, the suction region adjustment portion 40 is also configured to cover the suction holes 71*b* from both sides in the front-rear direction with the support surface 71*a* interposed therebetween. As illustrated in FIG. 2, the suction region alteration unit 40 is further provided with a third mobile body 63*a*, a fourth mobile body 63*b*, a second blocking structure 65, and a second accommodation unit 67.

The third mobile body 63*a* is configured to be movable along the first guide member 41*a*. A position in the front-rear direction of the third mobile body 63*a* is a position that is symmetrical to the first mobile body 43*a* with reference to the center C in the front-rear direction of the support surface 71*a*. The third mobile body 63*a* is fixed to the first belt lower portion 42*a*L. Thus, the first mobile body 43*a* fixed to the first belt upper portion 42*a*U and the third mobile body 63*a* fixed to the first belt lower portion 42*a*L are moved, by the rotation of the first belt 42*a*, in a direction separating from each other or in a direction approaching each other. At this time, movement distances of the first mobile body 43*a* and the third mobile body 63*a* are the same as each other. The first belt 42*a* corresponds to an example of an "endless belt".

The fourth mobile body 63*b* is configured to be movable along the second guide member 41*b*. The position of the fourth mobile body 63*b* in the front-rear direction is a position that is symmetrical to the second mobile body 43*b* with reference to the center C in the front-rear direction of the support surface 71*a*. As illustrated in FIG. 4, the fourth mobile body 63*b* is fixed to the second belt lower portion 42*b*L. Therefore, by the rotation of the second belt 42*b*, the fourth mobile body 63*b*, and the second mobile body 42*b* fixed to the second belt upper portion 42*b*U are moved by the same distance in opposing directions to each other.

As illustrated in FIGS. 2 and 3, the second blocking structure 65 includes a second suspension portion 65*a* and a second sheet 65*b*. The second suspension portion 65*a* is suspended between the third mobile body 63*a* and the fourth mobile body 63*b*. The second suspension portion 65*a* extends along the left-right direction, is constituted by a resin band facing the support surface 71*a*, and has flexibility. A position of the second suspension portion 65*a* with respect to the support surface 71*a* can be moved in the front-rear direction together with the third mobile body 63*a* and the fourth mobile body 63*b*.

As described above, the first mobile body 43*a* and the third mobile body 63*a*, and the second mobile body 43*b* and the fourth mobile body 63*b* are each positioned to be symmetrical to each other with reference to the center C in the front-rear direction of the support surface 71*a*. Thus, as illustrated in FIG. 3, the first suspension portion 45*a* and the second suspension portion 65*a* are located at positions separated from the center C in the front-rear direction of the support surface 71*a* by the same distance D.

The second sheet 65*b* is a sheet having flexibility, and is a synthetic resin, for example. The second sheet 65*b* may be a sheet having low air permeability. The air permeability of the second sheet 65*b* is low to a degree that, when the second sheet 65*b* overlaps the suction holes 71*b*, the second sheet 65*b* imparts a ventilation resistance to an air flow passing through the suction holes 71*b*. The second sheet 65*b* may block the suction holes 71*b* and block the air flow through the suction holes 71*b*. The width W in the left-right direction of the second sheet 65*b* is the same as the width W in the left-right direction of the first sheet 45*b*, and is greater than the width Wb in the left-right direction of the suction region B. The front end of the second sheet 65*b* is coupled to the second suspension portion 65*a*, and the rear end of the second sheet 65*b* is fixed to the second accommodation unit 67. In other words, the second sheet 65*b* extends from the second suspension portion 65*a* to the rear in the front-rear direction. The rear corresponds to an example of "another side in the second direction". Accordingly, as described below, as a result of the second suspension portion 65*a* moving in the forward direction together with the third mobile body 63*a* and the fourth mobile body 63*b*, the second sheet 65*b* is pulled to a position overlapping a portion of the suction region B.

The second accommodation unit 67 accommodates a portion of the second sheet 65*b*. The second accommodation unit 67 is disposed to the rear of the platen 71, that is, on the opposite side from the first accommodation unit 47 with respect to the platen 71 in the front-rear direction, and is provided at a position where at least the opening thereof does not overlap the suction region B in plan view. The second accommodation unit 67 extends across the width W of the second sheet 65*b* in the left-right direction. The second accommodation unit 67 is provided with a second sheet fixing portion 67*c*, a second pulling out portion 67*d*, a second weight 67*b*, and second grooves 67*a*.

As illustrated in FIG. 3, the second sheet fixing portion 67*c* is a plate-like portion that is positioned at the rear end of the second accommodation unit 67 and extends across the width of the second accommodation unit 67 in the left-right direction. The second sheet fixing portion 67*c* is fixed to the rear end of the second sheet 65*b* over the entire left-right direction of the second sheet 65*b*, using screw fastenings, for example.

The second pulling out portion 67*d* is a curved plate-like portion that is positioned at the front end of the second accommodation unit 67 and extends across the width of the second accommodation unit 67 in the left-right direction. The upper end of the second pulling out portion 67*d* extends along the support surface 71*a* of the platen 71 and the lower end extends along edges of the second grooves 67*a*.

The second groove 67*a* is a groove that opens upward between the second seat fixing portion 67*c* and the second pulling out portion 67*d*. An opening above the second groove 67*a* constitutes the opening portion of the second accommodation unit 67. The second grooves 67*a* are formed as a pair, at both ends of the second accommodation unit 67 in the left-right direction. The second groove 67*a* is formed so as to be inclined forward in the upward to downward direction. In other words, in the front-rear direction, when seen from the upper end of the second groove 67*a*, the lower end of the second groove 67*a* is in a direction closer to the center of the platen 71.

The second weight 67*b* is an independent member having a shaft shape that fits into the second grooves 67*a*, and extends in the left-right direction. More specifically, the second weight 67*b* is constituted by a rod-shaped portion having a cylindrical shape whose length in left-right direction is substantially equivalent to a space between the pair of second grooves 67*a*, and by retaining portions, which are disposed to the outside from both ends of the rod-shaped portion in the left and right directions, and which are larger than the width of the second grooves 67*a*. When fitted into the second grooves 67*a*, the second weight 67*b* can move diagonally upward and downward.

The rear end of the second sheet 65*b* is fixed to the second sheet fixing portion 67*c*, and the front end of the second sheet 65*b* is coupled to the second suspension portion 65*a*, and overlaps the second grooves 67*a* in plan view. Under its own weight, the second weight 67*b* presses the second sheet 65*b* downward, from above the second sheet 65*b*, between the second sheet fixing portion 67*c* and the second pulling out portion 67*d*, and causes the second sheet 65*b* to bend. As a result, a portion of the second sheet 65*b* is accommodated in the second accommodation unit 67.

As described above, the third mobile body 63*a* is fixed to the first belt 42*a*, and the fourth mobile body 63*b* is fixed to the second belt 42*b*. Accordingly, when the first belt 42*a* rotates along with the movement of the third mobile body 63*a*, the coupling member 42*s* transmits the rotation of the first belt 42*a* to the second belt 42*b*, via the first pulley 42*sa* and the second pulley 42*sb*. Thus, the third mobile body 63*a* and the fourth mobile body 63*b* move in synchronization with each other, and the second suspension portion 65*a* and the second sheet portion 65*b* also follow this movement. In this way, the suction region alteration unit 40 is configured such that the second sheet 65*b* accommodated in the second accommodation unit 67 can be pulled out to a position overlapping a portion of the suction region B by causing the third mobile body 63*a* to move in a direction away from the second accommodation unit 67. Further, as a result of the third mobile body 63*a* and the fourth mobile body 63*b* moving in synchronization with each other, the second blocking structure 65 moves in the second direction while maintaining a state of being parallel to the ends in the width direction of the recording medium M. Thus, the size of a region covered by the second sheet 65*b* in the suction region B can be changed in accordance with the width of the recording medium M in a way in which this region does not become a shape that is inclined with respect to the ends in the width direction of the recording medium M.

As illustrated in FIG. 2, the first guide member 41*a*, the first pulley 42*sa*, and the third pulley 42*c* described above are respectively fixed to a first base plate 48*a* provided to the right of the platen 71. The first base plate 48*a* is a plate provided parallel to the support surface 71*a*. Two air cylinders 46 are provided below the first base plate 48*a*. The air cylinder 46 is provided with a movable portion that is movable in the up-down direction, and supports the first base plate 48*a* by the movable portion. An air tank and a speed controller (not illustrated) are coupled to the air cylinder 46, and the movable portion of the air cylinder 46 moves up and down by an operator operating the air cylinder 46 via an operation unit (not illustrated). The speed controller controls the movement speed of the air cylinder 46 in the up and down directions, based on an operation instruction of the air cylinder 46. By operating the movable portions of the air cylinders 46 up and down, the first base plate 48*a* moves up and down.

Similarly, the second guide member 41*b*, the second pulley 42*sb*, and the fourth pulley 42*d* are fixed to a second base plate 48*b* provided to the left of the platen 71. The second base plate 48*b* is a plate provided parallel to the support surface 71*a*. The second base plate 48*b* is supported from below by the movable portions of the two air cylinders 46. By operating the movable portions of the air cylinders 46 up and down, the second base plate 48*b* moves up and down.

When the movable portions of the air cylinders 46 are positioned at the lowest position, as illustrated in FIG. 5, the first mobile body 43*a* and the third mobile body 63*a* are respectively positioned below the support surface 71*a*. Similarly, when the movable portions of the air cylinders 46 are positioned at the lowest position, the second mobile body 43*b* and the fourth mobile body 63*b* are positioned below the support surface 71*a*. At this time, the first suspension portion 45*a* and the second suspension portion 65*a* respectively come into contact with the support surface 71*a* from above, and extend diagonally downward at the left and right of the support surface 71*a*.

Further, when the movable portions of the air cylinders 46 are positioned at the highest position, the first mobile body 43*a* and the third mobile body 63*a* are respectively positioned above the support surface 71*a*. Similarly, when the movable portions of the air cylinders 46 are positioned at the highest position, the second mobile body 43*b* and the fourth mobile body 63*b* are respectively positioned above the support surface 71*a*. In this case, as indicated by dashed lines in FIG. 5, the first suspension portion 45*a* and the second suspension portion 65*a* are respectively separated upward from the support surface 71*a*.

3. Operation of Printing Apparatus 3.1. Operation When Width of Recording Medium Is Changed Here, an operation will be described, in the printing apparatus 1, when the size of the recording medium M is changed.

When the new recording medium M is set, the operator operates the operation unit and moves the movable portions of the air cylinders 46 to the highest position. At this time, the first sheet 45*b* and the second sheet 65*b* are pushed, from above, into the first grooves 47*a* and the second grooves 67*a*, by the first weight 47*b* and the second weight 67*b*. In this way, a portion of the first sheet 45*b* and a portion of the second sheet 65*b* are automatically accommodated in the first accommodation unit 47 and the second accommodation unit 67, respectively. Further, in this state, the first suspension portion 45*a* and the second suspension portion 65*a* are separated upward from the support surface 71*a*. Further, on the support surface 71*a*, the recording medium M is pulled in the left-right direction while being in contact with the support surface 71*a*. Thus, the first suspension portion 45*a* and the second suspension portion 65*a* are respectively positioned above the recording medium M.

In this state, the operator moves the first mobile body 43*a* in the front-rear direction along the first guide member 41*a*. When the first mobile body 43*a* moves in the front-rear direction, the first belt 42*a* fixed to the first mobile body 43*a* rotates. Therefore, in synchronization with the movement of the first mobile body 43*a*, the third mobile body 63*a* also moves in the front-rear direction along the first guide member 41*a*. At this time, the first mobile body 43*a* and the third mobile body 63*a* move, symmetrically with respect to the center C in the front-rear direction of the support surface 71*a*, in the direction separating from each other or in the direction approaching each other.

Further, the first pulley 42*sa* rotates along with the rotation of the first belt 42*a*. As a result, the coupling member 42*s* and the second pulley 42*sb* rotate in the same direction as the first pulley 42*sa*. Thus, in synchronization with the rotation of the first belt 42*a*, the second belt 42*b* rotates by the same movement amount in the same direction. Accordingly, the first mobile body 43*a*, the second mobile body 43*b*, the third mobile body 63*a*, and the fourth mobile body 63*b* move in synchronization with each other. Since the first mobile body 43*a* and the second mobile body 43*b* move in the same direction by the same movement amount, the first suspension portion 45*a* always extends along the left-right direction. Similarly, since the third mobile body 63*a* and the fourth mobile body 63*b* move in the same direction by the same movement amount, the second suspension portion 65*a* always extends along the left-right direction. Further, as described above, since the second mobile body 43*b* and the fourth mobile body 63*b* are in positions symmetrical to each other with reference to the center C in the front-rear direction of the support surface 71*a*, the first suspension portion 45*a* and the second suspension portion 65*a* are always in positions symmetrical to each other with reference to the center C in the front-rear direction of the support surface 71*a*.

Accordingly, by operating only the first mobile body 43*a* in the front-rear direction, the operator can move the first suspension portion 45*a* and the second suspension portion 65*a* at the same time in the direction in which the first suspension portion 45*a* and the second suspension portion 65*a* are separated from each other, or in the direction in which the first suspension portion 45*a* and the second suspension portion 65*a* approach each other.

Figure 6:
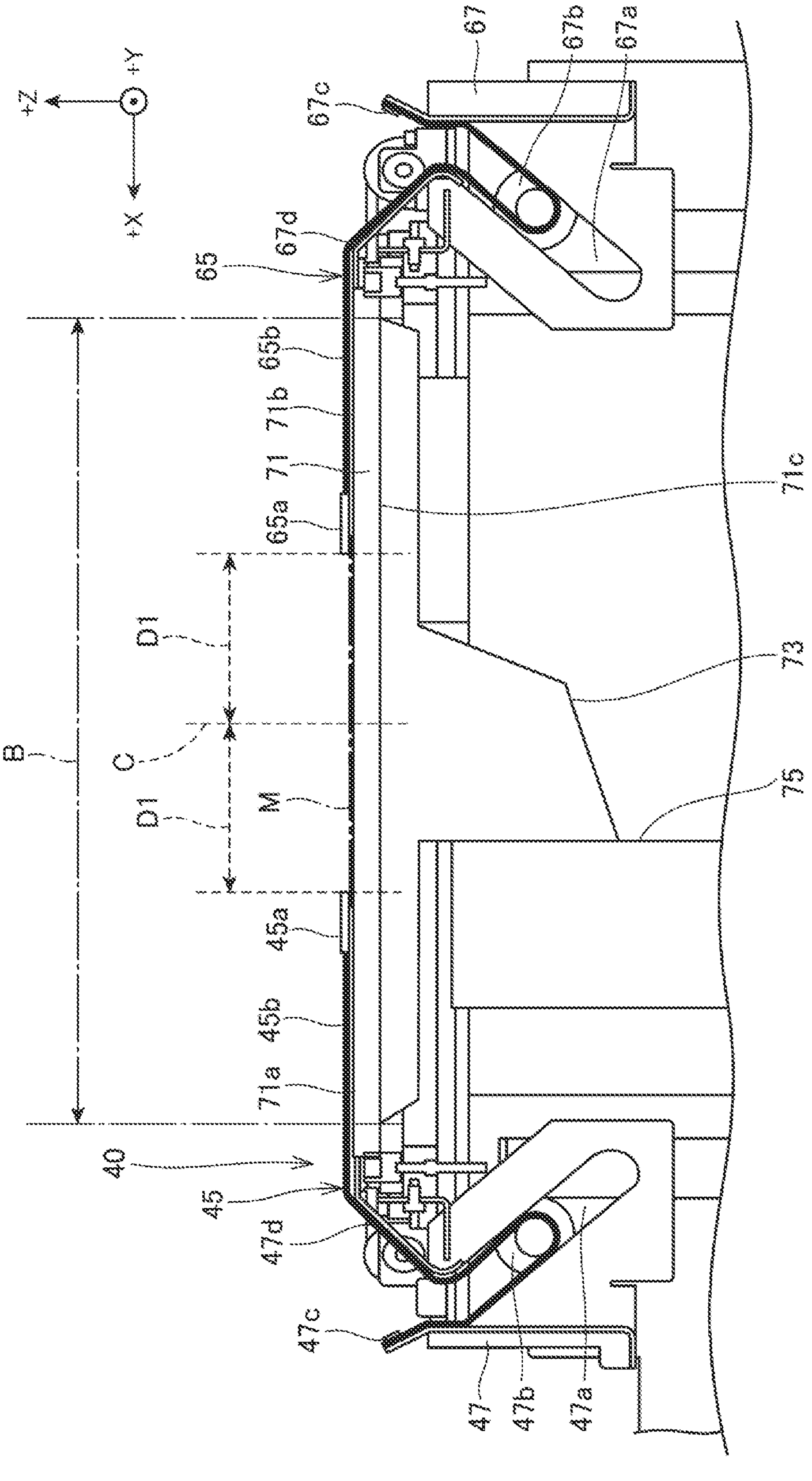
FIG. 6 is a cross-sectional view of the suction region alteration unit.

The operator moves the second mobile body 43*b* so that the ends in the front-rear direction of the recording medium M, the first suspension portion 45*a*, and the second suspension portion 65*a* slightly overlap each other. In this state, the operator operates the operation unit and moves the movable portions of the air cylinders 46 to the lowest position. As a result, as illustrated in FIG. 6, the first suspension portion 45*a* and the second suspension portion 65*a* press the ends in the front-rear direction of the recording medium M from above. At this time, the first suspension portion 45*a* and the second suspension portion 65*a* are at positions separated from the center C in the front-rear direction of the support surface 71*a* by the same distance D1. Additionally, the entire surface of the suction region B is covered by the recording medium M, the first blocking structure 45, and the second blocking structure 65 from above. Furthermore, a state is obtained in which tension is applied to the first sheet 45*b* and the second sheet 65*b* by the first weight 47*b* and the second weight 67*b*. Thus, the first sheet 45*b* and the second sheet 65*b* cover the suction region B without becoming slack. The printing can be performed at the end of the above operation. At the time of printing, the recording medium M is transported so as to pass between the support surface 71*a* and the first suspension portion 45*a*, and between the support surface 71*a* and the second suspension portion 65*a*.

3.2. Operation at Time of Printing

At the time of printing by the printing apparatus 1, the blower 75 is driven under the control of a control unit (not illustrated), and a negative pressure is generated in the air intake duct 73. In this way, air suction through the suction holes 71*b* is started. At this time, a portion of the suction region B overlaps the recording medium M, and a suction force for suctioning the recording medium M to the support surface 71*a* is generated in the suction holes 71*b*. Then, the suction holes 71*b* not overlapping the recording medium M in the suction region B are covered by the first blocking structure 45 and the second blocking structure 65. Since ventilation is inhibited in these suction holes 71*b*, negative pressure in the air intake duct 73 is less likely to be lost due to the opening of the suction holes 71*b*, and the recording medium M is strongly suctioned to the support surface 71*a*.

Further, the ends in the front-rear direction of the recording medium M are pressed against the support surface 71*a* from above by the first suspension portion 45*a* and the second suspension portion 65*a*. Thus, the recording medium M adheres closely to the support surface 71*a* without curling at the ends in the front-rear direction.

4. Effects and the Like

As described above, the printing apparatus 1 according to the embodiment includes the winding unit 35 that transports the recording medium M along the left-right direction, and the printing head 51 that discharges the ink onto the recording medium M. Further, the printing apparatus 1 includes the support surface 71*a* that faces the printing head 51 with the transport path of the recording medium M interposed therebetween, and includes the platen 71 that supports the recording medium M by the support surface 71*a*. Furthermore, the printing apparatus 1 includes the blower 75 that sucks air, and the suction region alteration unit 40. The support surface 71*a* is constituted by a surface along the left-right direction and the front-rear direction orthogonal to the left-right direction, and includes the suction region B provided with the plurality of suction holes 71*b*. The blower 75 sucks air from the suction holes 71*b* via the air intake duct 73 disposed at the back surface 71*c* on the opposite side from the support surface 71*a*. The suction region alteration unit 40 is a member extending in the front-rear direction, and includes the first guide member 41*a* and the second guide member 41*b* disposed side-by-side in the left-right direction with the platen 71 interposed therebetween. Further, the suction region alteration unit 40 is provided with the first mobile body 43*a* that is movable along the first guide member 41*a*, the second mobile body 43*b* that is movable along the second guide member 41*b*, and the synchronization mechanism 42 that synchronizes the movement of the first mobile body 43*a* and the movement of the second mobile body 43*b*. Furthermore, the suction region alteration unit 40 includes the first blocking structure 45 that includes the first suspension portion 45*a* suspended between the first mobile body 43*a* and the second mobile body 43*b*, and the first sheet 45*b*, which has flexibility and is coupled to the first suspension portion 45*a*. In addition, the suction region alteration unit 40 includes the first accommodation unit 47 that accommodates at least a portion of the first sheet 45*b*. The position of the first suspension portion 45*a* facing the support surface 71*a* can move in the front-rear direction, together with the first mobile body 43*a* and the second mobile body 43*b*. The first sheet 45*b* extends from the first suspension portion 45*a* to the front in the front-rear direction, and is larger in the left-right direction than the suction region B. The first accommodation unit 47 is disposed to the front of the platen 71 in the front-rear direction, and the opening of the first accommodation unit 47 is at a position that does not overlap the suction region B in plan view. The printing apparatus 1 is configured such that the first sheet 45*b* accommodated in the first accommodation unit 47 can be pulled out to a position overlapping a portion of the suction region B in plan view by causing the first mobile body 43*a* to move in the direction away from the first accommodation unit 47.

According to this configuration, the first mobile body 43*a* and the second mobile body 43*b* move in synchronization with each other. Therefore, by simply moving the first mobile body 43*a*, the first sheet 45*b* can be easily pulled out while maintaining the state in which the first suspension portion 45*a* extends along the left-right direction. In this way, in the configuration of suctioning the recording medium M to the platen 71, a configuration can be realized in which the suction holes 71*b* can be easily blocked in accordance with the size of the recording medium M. Further, since a portion of the first sheet 45*b* can be accommodated in the first accommodation unit 47, it is not necessary to provide a large space for accommodating a member that blocks the suction holes 71*b*, and the printing apparatus 1 can be downsized.

In the suction region alteration unit 40, the first accommodation unit 47 includes the sheet fixing portion 47*c* that fixes the front end of the first sheet 45*b*, and the pulling out portion 47*d* from which the first sheet portion 45*b* is pulled out. Further, the first accommodation unit 47 includes the shaft-shaped first weight 47*b*, which presses the first sheet 45*b* downward between the sheet fixing portion 47*c* and the pulling out portion 47*d*, and causes the first sheet 45*b* to bend. Furthermore, the first accommodation unit 47 includes the first grooves 47*a* that movably support the first weight 47*b*, and the first grooves 47*a* are disposed at both ends of the first accommodation unit 47 in the left-right direction. The rear end of the first sheet 45*b* is coupled to the first suspension portion 45*a*.

According to this configuration, the first accommodation unit 47 can be realized by a simple configuration. Accordingly, the printing apparatus 1 can be downsized using a simple configuration. Further, since the first sheet 45*b* is pressed downward by the first weight 47*b*, the first sheet 45*b* does not become slack on the support surface 71*a*. Thus, the first sheet 45*b* can more reliably block the suction holes 71*b*, and thus the recording medium M is more closely adhered to the support surface 71*a*. In this way, it is possible to improve the quality of the printing in the printing apparatus 1.

The first grooves 47*a* are grooves that fit with the ends of the first weight 47*b* and support the first weight 47*b* to be movable diagonally in the up-down direction. When seen from the upper end of the first groove 47*a*, the lower end of the first groove 47*a* is in a direction closer to the center of the platen 71.

According to this configuration, the first accommodation unit 47 can be further downsized using a simple configuration. Thus, further downsizing of the printing apparatus 1 can be achieved.

The synchronization mechanism 42 includes the annular first belt 42*a* that is stretched along the first guide member 41*a*, and the annular second belt 42*b* that is stretched along the second guide member 41*b*. Further, the synchronization mechanism 42 is provided with the first pulley 42*sa* that engages with the first belt 42*a* and is rotated by the movement of the first belt 42*a*, and the second pulley 42*sb* that engages with the second belt 42*b*. Furthermore, the synchronization mechanism 42 is provided with the coupling member 42*s* that is disposed along the left-right direction and couples the first pulley 42*sa* and the second pulley 42*sb*. In the suction region alteration unit 40, the first mobile body 43*a* is fixed to the first belt 42*a*, and the second mobile body 43*b* is fixed to the second belt 42*b*. When the first belt 42*a* rotates along with the movement of the first mobile body 43*a*, the coupling member 42*s* transmits the rotation of the first belt 42*a* to the second belt 42*b*, via the first pulley 42*sa* and the second pulley 42*sb*.

According to this configuration, the synchronization mechanism 42 can be realized by a simple configuration. Thus, the convenience of the printing apparatus 1 can be improved using the simple configuration.

The printing apparatus 1 is provided with the third pulley 42*c* that engages with the first belt 42*a* and is rotated by the movement of the first belt 42*a*, and the third mobile body 63*a* fixed to the first belt 42*a*. The first pulley 42*sa* is disposed at the front end side of the first guide member 41*a*, the third pulley 42*c* is disposed at the rear end side of the first guide member 41*a*, and the first belt 42*a* is stretched over the first pulley 42*sa* and the third pulley 42*c*. The first mobile body 43*a* is fixed to the first belt 42*a*, and the first mobile body 43*a* and the third mobile body 63*a* move, along with the rotation of the first belt 42*a*, in a direction separating from each other or in a direction approaching each other.

According to this configuration, along with the movement of the first mobile body 43*a*, the third mobile body 63*a* moves in the opposite direction from a movement direction of the first mobile body 43*a*. Thus, the operator can move the third mobile body 63*a* by simply moving the first mobile body 43*a*, without operating the third mobile body 63*a*. In this way, the convenience of the printing apparatus 1 is improved.

Further, the suction region alteration unit 40 is provided with the third mobile body 63*a* that is movable along the first guide member 41*a* and the fourth mobile body 63*b* that is movable along the second guide member 41*b*. Further, the suction region alteration unit 40 includes the second blocking structure 65 that includes the second suspension portion 65*a* suspended between the third mobile body 63*a* and the fourth mobile body 63*b*, and the second sheet 65*b*, which has flexibility and is attached to the second suspension portion 65*a*. Furthermore, the suction region alteration unit 40 includes the second accommodation unit 67 that accommodates at least a portion of the second sheet 65*b*. The position of the second suspension portion 65*a* facing the support surface 71*a* can move in the front-rear direction, together with the third mobile body 63*a* and the fourth mobile body 63*b*. The second sheet 65*b* extends from the second suspension portion 65*a* to the rear in the front-rear direction, and is larger in the left-right direction than the suction region B. In the front-rear direction, the second accommodation unit 67 is disposed on the opposite side from the first accommodation unit 47 with respect to the platen 71, and the opening of the second accommodation unit 67 is at a position that does not overlap the suction region B in plan view. The second accommodation unit 67 is configured such that the second sheet 65*b* accommodated in the second accommodation unit 67 can be pulled out to a position overlapping a portion of the suction region B in plan view by causing the third mobile body 63*a* to move in the direction away from the second accommodation unit 67.

According to this configuration, the first sheet 45*b* and the second sheet 65*b* can overlap the suction region B from both sides in the front-rear direction of the support surface 71*a*. Thus, a degree of freedom in the position at which the recording medium M is supported, by the support surface 71*a* in the front-rear direction, is improved. In this way, a degree of freedom in the design of the printing apparatus 1 is improved.

Further, the recording medium M is transported so as to pass between the support surface 71*a* and the first suspension portion 45*a*, and between the support surface 71*a* and the second suspension portion 65*a*. The first suspension portion 45*a* and the second suspension portion 65*a* press the ends in the front-rear direction of the recording medium M from above.

According to this configuration, it is possible to press down curling at both ends in the front-rear direction of the recording medium M from above, using the first suspension portion 45*a* and the second suspension portion 65*a*. Thus, the recording medium M is even more closely adhered to the support surface 71*a*, and the printing quality of the printing apparatus 1 is improved.

5. Other Embodiments

Note that the above embodiment merely describes a specific example in which the present disclosure is applied. The present disclosure is not limited to the configurations of the embodiment described above, and can be implemented in various aspects without departing from the scope or gist of the disclosure.

In the printing apparatus 1, the center of the recording medium M does not overlap the center C in the front-rear direction of the support surface 71*a*, and, for example, the recording medium M may be transported such that the rear end of the recording medium M and the rear end of the suction region B overlap each other. In this case, it is possible to cover the entire surface of the suction region B, without providing the third mobile body 63*a*, the fourth mobile body 63*b*, the second blocking structure 65, and the second accommodation unit 67. Thus, the configuration is simplified. However, as described in the embodiment, the curling of the recording medium M can be pressed by the second suspension portion 65*a*.

Note that the first accommodation unit 47 may be configured to include a winding mechanism that winds, from the front end side, the first sheet 45*b* whose rear end is held by the first suspension portion 45*a*. The winding mechanism may have a configuration, for example, in which the front end of the first sheet 45*b* is coupled to a winding pipe that can rotate around an axis extending in the left-right direction, and the winding pipe is rotated by a coil spring.

In the printing apparatus 1, the first blocking structure 45 includes the first suspension portion 45*a* and the first sheet 45*b*, but the configuration is not limited thereto. For example, a blocking structure in which the first suspension portion 45*a* and the first sheet 45*b* are integrally formed may be used. The same applies to the second blocking structure 65.

In the printing apparatus 1, the first grooves 47*a* and the second grooves 67*a* are formed so as to be inclined toward the center C in the front-rear direction of the support surface 71*a* from the upward to the downward direction, but the configuration is not limited thereto. For example, grooves may be formed to be vertical from the upward to the downward direction, or may be inclined in a direction away from the support surface 71*a* in the front-rear direction.

What is claimed is:

1. A printing apparatus comprising:

a transport unit configured to transport a recording medium along a first direction;

a printing head configured to discharge ink onto the recording medium;

a recording medium support unit including a support surface and configured to support the recording medium by the support surface, the support surface facing the printing head with a transport path of the recording medium interposed between the printing head and the support surface;

an air intake unit configured to suck air; and a suction region alteration unit, wherein the support surface is constituted by a surface extending along the first direction and a second direction orthogonal to the first direction, and includes a suction region provided with a plurality of suction holes, the air intake unit sucks air from the plurality of suction holes via a duct disposed at a surface on an opposite side from the support surface, the suction region alteration unit includes:

a first guide member and a second guide member that are members extending in the second direction and that are disposed side by side in the first direction with the recording medium support unit interposed between the first guide member and the second guide member, a first mobile body configured to move along the first guide member, a second mobile body configured to move along the second guide member, a synchronization mechanism configured to synchronize movement of the first mobile body and movement of the second mobile body, a first blocking structure including a first suspension portion suspended between the first mobile body and the second mobile body, and a first sheet having flexibility and coupled to the first suspension portion, and a first accommodation unit accommodating at least a portion of the first sheet, a position, of the first suspension portion, facing the support surface is movable in the second direction together with the first mobile body and the second mobile body, the first sheet extends to one side in the second direction from the first suspension portion, and is larger than the suction region in the first direction, the first accommodation unit is disposed on the one side in the second direction of the recording medium support unit, and an opening of the first accommodation unit is at a position not overlapping the suction region in plan view, and the first sheet accommodated in the first accommodation unit is configured to be pulled out to a position overlapping a portion of the suction region in plan view by the first mobile body being moved in a direction away from the first accommodation unit.

2. The printing apparatus according to claim 1, wherein the first accommodation unit includes:

a sheet fixing portion configured to fix one end of the first sheet, a pulling out portion from which the first sheet is pulled out, a first weight having a shaft shape and pressing the first sheet downward between the sheet fixing portion and the pulling out portion to cause the first sheet to bend, and a weight guide movably supporting the first weight, the weight guide is disposed at both ends of the first accommodation unit in the first direction, and another end of the first sheet is coupled to the first suspension portion.

3. The printing apparatus according to claim 2, wherein the weight guide is a groove fitted with an end of the first weight and supporting the first weight to be movable diagonally upward and downward and when seen from an upper end of the weight guide, a lower end of the weight guide is positioned in a direction closer to a center of the recording medium support unit.

4. The printing apparatus according to claim 1, wherein the synchronization mechanism includes:

a first belt having an annular shape and stretched along the first guide member, a second belt having an annular shape and stretched along the second guide member, a first pulley meshing with the first belt and configured to be rotated by movement of the first belt, a second pulley meshing with the second belt, and a coupling member disposed along the first direction and coupling together the first pulley and the second pulley, the first mobile body is fixed to the first belt and the second mobile body is fixed to the second belt, and when the first belt rotates along with movement of the first mobile body, the coupling member transmits the rotation of the first belt to the second belt via the first pulley and the second pulley.

5. The printing apparatus according to claim 4, further comprising:

a third pulley meshing with the first belt and configured to be rotated by the movement of the first belt; and a third mobile body fixed to the first belt, wherein the first pulley is disposed at one end side of the first guide member, the third pulley is disposed at another end side of the first guide member, and the first belt is stretched over the first pulley and the third pulley, the first mobile body is fixed to the first belt, and the first mobile body and the third mobile body move, along with the rotation of the first belt, in a direction separating from each other or in a direction approaching each other.

6. The printing apparatus according to claim 5, wherein the third mobile body is configured to move along the first guide member, the suction region alteration unit includes:

a fourth mobile body configured to move along the second guide member, a second blocking structure including a second suspension portion suspended between the third mobile body and the fourth mobile body, and a second sheet having flexibility and attached to the second suspension portion, and a second accommodation unit accommodating at least a portion of the second sheet, a position, of the second suspension portion, facing the support surface is movable in the second direction together with the third mobile body and the fourth mobile body, the second sheet extends to another side in the second direction from the second suspension portion, and is larger than the suction region in the first direction, the second accommodation unit is disposed, in the second direction, on an opposite side from the first accommodation unit with respect to the recording medium support unit, and an opening of the second accommodation unit is at a position not overlapping the suction region in plan view, and the second sheet accommodated in the second accommodation unit is configured to be pulled out to a position overlapping a portion of the suction region in plan view by the third mobile body being moved in a direction away from the second accommodation unit.

7. The printing apparatus according to claim 6, wherein the recording medium is transported passing between the support surface and the first suspension portion and between the support surface and the second suspension portion and the first suspension portion and the second suspension portion press ends in the second direction of the recording medium from above.

* * * * *